March 16, 1965 E. C. BOPF ETAL 3,173,235
COTTON PICKER SPINDLE ASSEMBLY
Filed April 24, 1963

INVENTORS
E.C. BOPF &
A.L. HUBBARD
BY William A. Murray
ATTORNEY

United States Patent Office 3,173,235
Patented Mar. 16, 1965

3,173,235
COTTON PICKER SPINDLE ASSEMBLY
Edward C. Bopf and Arthur L. Hubbard, Des Moines, Iowa, assignors to Deere & Company, Moline, Ill., a corporation of Delaware
Filed Apr. 24, 1963, Ser. No. 275,457
2 Claims. (Cl. 56—50)

This invention relates to an improved cotton picker spindle assembly used on conventional cotton harvesters.

In one of the more conventional type cotton harvesters, the harvesting mechanism includes an upright rotating picking drum having laterally extending picking spindles that may extend into the plant passage as the drum rotates for the purpose of picking the cotton from the plants. The spindles normally rotate about their own axes and are supported from upright picker bars by means of laterally extending spindle supports. Each support has an inner journal rotatably retaining the laterally extending spindle. Each spindle is normally composed of a cylindrical support end disposed within the support journal and an outer cone-shaped picker end having a plurality of angularly spaced rows of teeth or barbs thereon. Adjacent the support and overlapping a portion of the spindle is a cap that seals the support against losing the lubricant required in the journal operation and also prevents the lubricant from contacting the ripened cotton bolls so as not to reduce the overall quality of the cotton being harvested.

In the aforesaid type of cotton harvester, it is normal for the picking teeth to terminate short of the sealing cap and consequently adjacent the sealing cap the spindle is smooth on its entire surface. Due to the high rotation of the individual spindles, this condition creates a situation in which cotton fibers will tend to wrap around the spindle adjacent the cap and consequently this fibrous material will build up in a ring which eventually becomes dirty or soiled. As the ring increases in size, eventually it will be doffed or will otherwise lose its adhesive ability on the smooth spindle surface and will become mixed with the ripened cotton bolls and pass into the container receiving the cotton bolls. In sampling cotton to determine the quality of the cotton and eventually the price to be paid for the cotton, a sample containing one of the soiled rings would considerably reduce the quality of the cotton and consequently create a reduced price for the entire load of cotton.

With the above in mind, it is proposed in the present invention to provide a cutting edge on the cotton spindle extending under the sealing cap and into the picking teeth of the spindle. By providing a cutting edge, the cotton fibers collected on the spindle adjacent the cap will be cut during the doffing operation. Consequently any build-up, if at all, will not be permitted to build up to the extent that damage to the quality of the cotton results.

Other objects and advantages of the present invention will become apparent to those skilled in the art as the nature of the invention is better understood from the following description and as shown in the following drawings.

Figure 1:
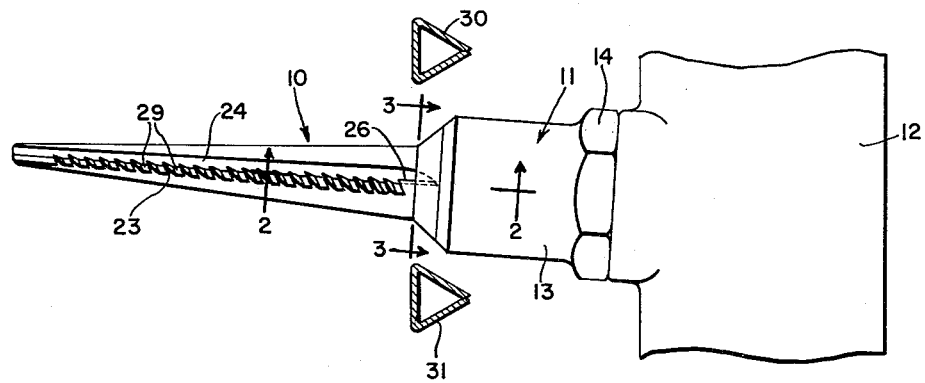
FIG. 1 is a side view of a cotton spindle assembly and a portion of its supporting structure.

The entire cotton picker spindle assembly 10 is supported by a support member 11 threadedly attached to project outwardly on a main upright picker bar or support 12. The support 12 or bar may be of the type shown and described in U.S. Patent 2,767,542 issued to Mr. E. C. Bopf on October 23, 1956. The exact construction of the bar 12 is not of particular importance relative to this invention other than the fact that the drive for operating the spindle assembly is contained within the bar 12 in a conventional manner and as shown in the Bopf patent.

The picker spindle support 11 is composed of an outer shell 13 threaded at one end, so as to be received in the picker bar 12. A hexagonal shaped inner end 14 is provided for receiving a tool utilized in tightening the entire support 11 on the picker bar 12.

The shell 13 carries an internal bearing or journal 15 and has on its outer end a cap 16. The cap 16 is swaged to the outer surface of a picker spindle so as to be rigidly connected thereto. The shell member 13 is provided with an annular shoulder 17 at its outer end to receive the cap 16. One surface of the shoulder is a continuation of the edge of journal 15 and consequently the cap 16 may bear against the shoulder 17 and the journal 15. Normally lubricant is provided from the inner end of the support 11 for the journal 15. Consequently the cap 16 operates as a seal to limit the movement of lubricant onto the picker spindle and the cotton thereon.

Figure 2:
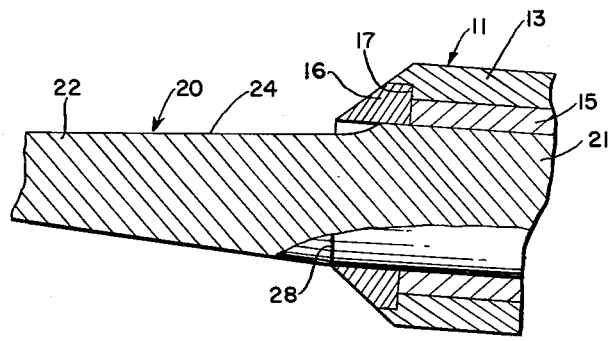
FIG. 2 is an enlarged sectional view taken substantially along the line 2—2 of FIG. 1.
Figure 3:
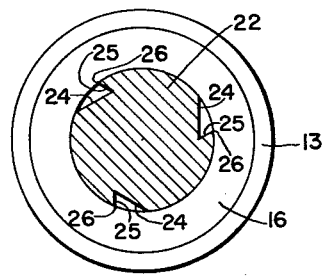
FIG. 3 is a sectional view taken substantially along the line 3—3 of FIG. 1.

The spindle 20 is composed of an elongated member having a cylindrical shaped support end 21 carried internally of the support structure 11. The extreme inner end is provided with a suitable gear, not shown, which drives the entire spindle to rotate about its axis. The spindle 20 has an outer cone shaped end 22 having several angularly spaced rows of picking barbs or teeth 23. The teeth 23 are formed in part by recess faces 24. The front of the teeth 23 is defined by a common ledge or plane 25 that extends from the cone surface 22 to the face 24 and defines with the surface an elongated cutting edge 26 that extends substantially the length of the cone shaped portion. Reviewing FIG. 2 it will be noted that the cylindrical shaped portion 21 of the spindle joins the cone shaped portion 22 at a juncture 28 substantially at the small or outer end of the cap 16. The edge 26 extends slightly inwardly of the cap 16 so that the cap overlies the terminal end of the cutting edge 26. This permits the cutting edge to extend under the support 11. However, the cutting edge 26 terminates between opposite edge ends of the cap 16 so that the lubricant for the journal 15 will not penetrate in large amounts that end of the picking spindle 20. The teeth 23 of the picker spindle are also formed by axially spaced notches 29 in the ledge 25 and the notches are shaped so as to form a pointed or barbed end of the teeth 23.

As shown in FIG. 1, there is provided a pair of grid bars 30, 31 with outer faces generally in vertical alinement with the cap 16. By so locating the bars 30, 31 the teeth adjacent the cap 16 are permitted to contact and harvest the cotton.

While only one form of the invention has been shown, it should be recognized that other forms and variations will occur to those skilled in the art. Therefore, while the present disclosure is shown and described in detail for the purpose of completely illustrating the principles of the invention, it is not the intention to limit or narrow the invention beyond the broad concepts set forth in the appended claims.

What is claimed is:

1. A cotton picker spindle assembly comprising: a spindle support having a spindle receiving opening defined by an inner journal; a picker spindle having a cylindrical shaped support portion carried by the inner journal of the spindle support and a picking end portion projecting from the support with a cone shaped picking surface with a juncture between the portions disposed outwardly but close to the support, said picking portion having a flat recessed face on the spindle, a ledge extending inwardly from the spindle surface to the recessed face and defining with the cone shaped surface a cutting edge extending axially along the surface of the picking portion and terminating at an end beyond the juncture; and an annular cap fixedly connected to the spindle adjacent the juncture of the cone shaped and cylindrical shaped portions and abutting the end of the support to seal that end of the support, said cap further having an outer surface tapered from a small end adjacent the picking portion to a large end adjacent the support and overlying the ends of the cutting edge whereby the cutting edge extends under the cap and terminates between the small and large ends of the cap.

2. The invention defined in claim 1 in which the ledge and recessed face extend substantially the full length of the picking end portion and the spindle being further characterized by having inwardly extending notches spaced lengthwise along the ledge and projecting inwardly from the cutting edge to define a row of picking teeth.

References Cited by the Examiner
UNITED STATES PATENTS

| | | | |
|---|---|---|---|
| 2,546,185 | 3/51 | Hagen | 56—50 |
| 2,876,612 | 3/59 | Walker et al. | 56—50 |
| 2,934,878 | 5/60 | Barbknecht et al. | 56—50 |
| 2,953,889 | 9/60 | Lindsay | 56—30 |
| 3,128,588 | 4/64 | West | 56—50 |

T. GRAHAM CRAVER, *Primary Examiner.*

RUSSELL R. KINSEY, *Examiner.*